(12) United States Patent
Shute et al.

(10) Patent No.: US 8,792,579 B2
(45) Date of Patent: Jul. 29, 2014

(54) CONTINUOUS OPEN LOOP CONTROL TO CLOSED LOOP CONTROL TRANSITION

(75) Inventors: Nick Shute, Munich (DE); Christian Mayer, Linz (AT); Andreas Schwarz, Rohrbach (AT); Andrea Camuffo, Munich (DE); Guenter Maerzinger, Linz (AT)

(73) Assignee: Intel Mobile Communications GmbH, Neubiberg (DE)

( * ) Notice: Subject to any disclaimer, the term of this patent is extended or adjusted under 35 U.S.C. 154(b) by 1164 days.

(21) Appl. No.: 12/170,207

(22) Filed: Jul. 9, 2008

(65) Prior Publication Data

US 2010/0008410 A1 Jan. 14, 2010

(51) Int. Cl.
*H04L 27/00* (2006.01)

(52) U.S. Cl.
USPC .......................................... 375/295; 455/522

(58) Field of Classification Search
CPC ... H04W 52/04; H04W 52/125; H04W 52/18; H04W 52/228; H03F 1/0205; H03G 3/3042; H04L 1/0003
USPC ................. 375/295; 330/279, 285; 455/63.1, 455/67.11, 69, 522, 3.02, 126
See application file for complete search history.

(56) References Cited

U.S. PATENT DOCUMENTS

| | | | |
|---|---|---|---|
| 6,356,736 B2 * | 3/2002 | Tomasz et al. | 455/3.02 |
| 6,970,715 B2 * | 11/2005 | Matsunami et al. | 455/522 |
| 7,205,842 B2 * | 4/2007 | Gustavsson et al. | 330/279 |
| 7,353,006 B2 * | 4/2008 | Gels et al. | 455/126 |
| 7,580,723 B2 * | 8/2009 | Schwent et al. | 455/522 |
| 2001/0006888 A1 * | 7/2001 | Posti et al. | 455/69 |
| 2005/0111383 A1 | 5/2005 | Grob et al. | |
| 2006/0035660 A1 * | 2/2006 | Anderson | 455/522 |
| 2006/0152285 A1 | 7/2006 | Gustavsson et al. | |
| 2007/0054635 A1 | 3/2007 | Black et al. | |

* cited by examiner

*Primary Examiner* — Daniel Washburn
*Assistant Examiner* — Fitwi Hailegiorgis
(74) *Attorney, Agent, or Firm* — Eschweiler & Associates, LLC

(57) ABSTRACT

This disclosure relates to a continuous open loop control to closed loop control transition.

16 Claims, 7 Drawing Sheets

CONTINUOUS OPEN LOOP CONTROL TO CLOSED LOOP CONTROL TRANSITION

BACKGROUND

In general, electronic systems that may require a wide and an accurate output power control range employ both open loop mode (i.e., without feedback), as well as closed loop mode (i.e., with feedback), for power control due to range limitations of detector diodes. Typical single and dual detector diode circuitries may provide a power measurement range of 30-35 dB. A detection circuitry with multiple detector diodes provides a wide power range; however, the complexity of such a circuitry may lead to inaccuracies and may be cost intensive.

In systems where accurate power steps may be required in both open loop and closed loop modes, usually a standard power control loop (PCL) may be used in the closed loop region and therefore a continuous power control transition between the two modes is required. If there is a difference between measured and reference signals during transition from the open loop mode to the closed loop mode, the standard PCL may immediately react to minimize the difference; however, this may cause an inaccurate power step across the transition boundary of the two modes. This error is caused by the original open loop estimation. This may lead to additional problems such as switching issues or spectrum widening.

The error during power transition from the open loop mode to the closed loop mode can occur, for example, in a communication device, such as a cell phone. For example, a base station may require a mobile station to transmit low output power in an open loop mode. In such a case, the mobile station may come to know of a difference between the measured signal and the reference signal only during transition from the open loop mode to the closed loop mode.

To avoid such a problem, in existing systems a slot-to-slot transition between the open loop mode and the closed loop mode is used (i.e., a single mode is selected at a particular time slot boundary). Loop state estimates, such as open or closed loop differences are sent back to a decision making block, which pre-determines a slot boundary at which the loop state is to be changed. This process may be used such that power steps at a particular slot boundary occur in only one of the modes (e.g., open or closed modes). Implementation of such a process requires intelligence and decision-making capabilities, as well as calculations to minimize step errors, normally during baseband processing, in addition to having prior knowledge of the direction of power change.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 3b is another implementation of the circuit diagram as shown in FIG. 3a.

DETAILED DESCRIPTION

Figure 1:
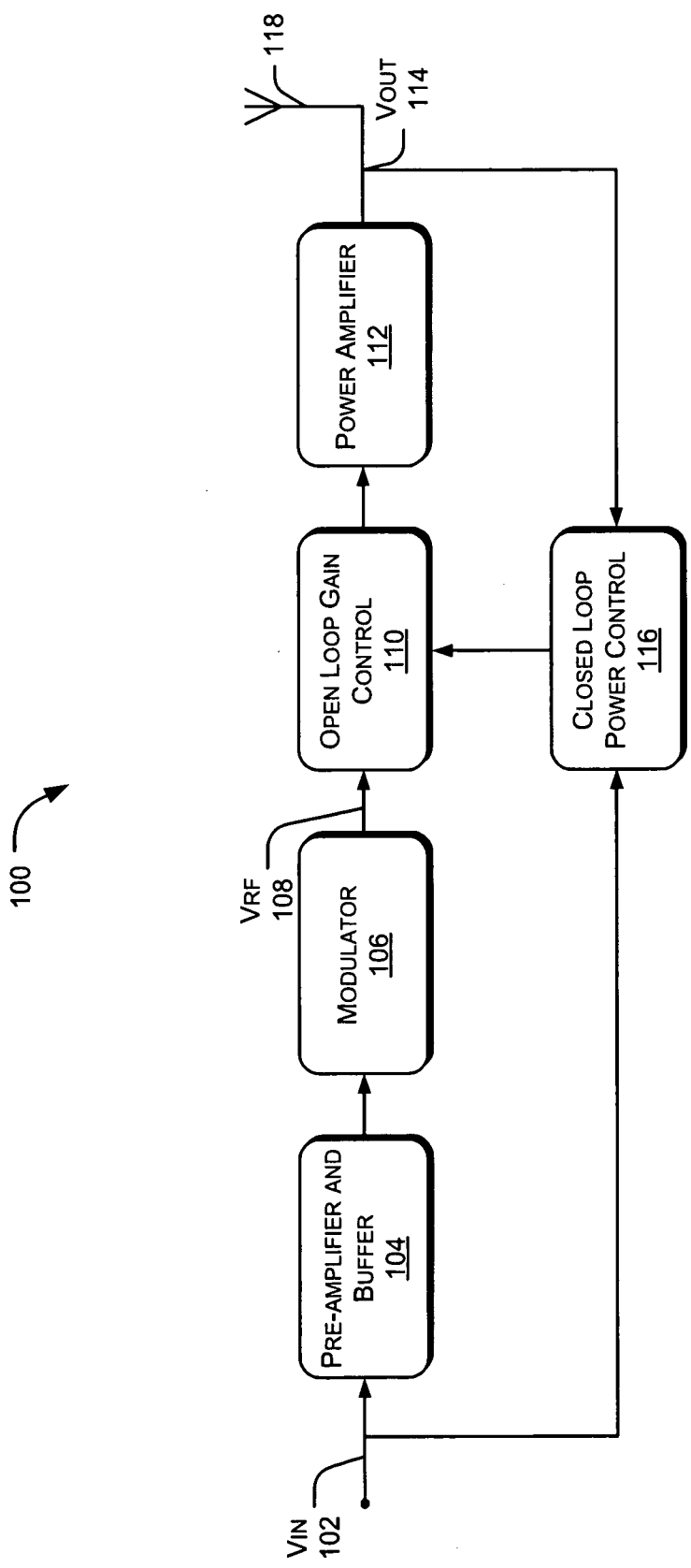
FIG. 1 is a block diagram illustrating an exemplary transmission section of a communication device that provides a continuous transition of a power signal from an open loop control to a closed loop control.

This disclosure is directed to techniques for a continuous open loop control to closed loop control transition. In particular, the techniques involve implementing a circuit providing a smooth transition from an open loop power control to a closed loop power control, and vice-versa. A disclosed exemplary circuit can be implemented in a variety of electronic or communication devices that may require consistent output power control. Devices that can benefit from the circuit include, but are not limited to, CMOS fabricated mobile phone transmitters compatible to 3GPP (3rd generation partnership project) standards such as GSM (Global System for Mobile communications) or UMTS (Universal Mobile Telecommunications System). The following systems and methods are described with reference to a mobile communication system; however, it will be appreciated that the disclosed techniques and circuits can be implemented generally in any similar electronic/communication system.

A mobile communication system, such as a cell phone, receives an input signal and modulates the input signal into a radio frequency (RF) signal. The output power of the RF signal should be controlled as per pre-specified requirements. The output power can be controlled during an open loop mode where the gain of a variable gain amplifier (VGA) can be directly adjusted to scale up or scale down the output power. In addition, the output power can be controlled during a closed loop mode as well, where the output power can be detected and sent back to the system if the output power does not meet the pre-specified requirements.

In the proposed circuitry, there are two points of control to the VGA. One point of control is the open loop mode control, and another point of control is the closed loop mode control. In the open loop mode, the gain of the VGA is directly controlled in accordance with a pre-specified reference value. In the closed loop mode, the output signal is sent back to the circuit to generate a closed loop reference value. The closed loop reference value is an offset from the pre-specified reference value by an error between the open loop mode and the closed loop mode. In the closed loop mode, the error generated during the transition is multiplied with the pre-specified reference value to provide an "offset-controlled loop".

Depending on gain control strategy, the "offset-controlled loop" may operate over a pre-defined gain control range, above which the gain may limit the power flow and the circuitry may transit into a standard PCL. Thereafter, a continuous transition is established in which no baseband interaction or decision-making may be required, and is independent of the direction of power change (i.e., power change due to level change continuity). With such a continuous transition, the device can operate in open loop mode and closed loop mode, for a particular power change request. For example, for a 3 dB power step, a transition from the open to the closed loop may happen half way through the step, without the addition of a step error due to initial open loop estimation error. Thus, the output power will have uniform steps in both open loop and closed loop modes and also across transition boundary.

Furthermore, the proposed technique does not add to spreading of an error signal generated during transition across slots, by ensuring that the reference value multiplied to the error signal is equal to the measured signal at the time of transition. Therefore, an effective "pre-locking" of measurement loop may be achieved.

Exemplary Systems

FIGS. 1 to 4 illustrate various block diagrams and circuit diagrams of a transmission section of an exemplary communication device that provides continuous transition of power from an open loop mode to a closed loop mode. The order in which the blocks of the system are described is not intended to be construed as a limitation, and any number of the described system blocks can be combined in any order to implement the system, or an alternate system. Additionally, individual blocks may be deleted from the system without departing from the spirit and scope of the subject matter described herein. Furthermore, the system can be implemented in any suitable hardware, firmware, or a combination thereof, without departing from the scope of the invention.

FIG. 1 illustrates a block diagram of an exemplary transmission section 100 of a communication device that provides smooth transition of power from the open loop mode to the closed loop mode. In one implementation, the transmission section 100 represents an RF transmission section of a mobile communication device, such as a cell phone. The transmission section 100 receives an input signal $V_{IN}$ 102. The $V_{IN}$ signal 102 can be an analog baseband signal that may correspond to any data including voice, text, or audio-video data. The $V_{IN}$ signal 102 is received at a pre-amplifier and buffer 104.

The pre-amplifier and buffer 104 amplifies $V_{IN}$ signal 102, making the $V_{IN}$ signal 102 suitable for further processing. The pre-amplifier and buffer 104 can provide a voltage gain to the $V_{IN}$ signal 102. The pre-amplifier and buffer 104 can additionally provide an electrical impedance transformation to the $V_{IN}$ signal 102 before any further processing of the signal 102. The generated amplified signal is then sent to a modulator 106.

The modulator 106, which may be an RF modulator, converts the amplified signal into a radio frequency-modulated signal $V_{RF}$ signal 108. The modulator 106 conditions the amplified signal to be capable of being transmitted through free space. The output power of the $V_{RF}$ signal 108 can be controlled via an open loop gain control 110.

The output power of the $V_{RF}$ signal 108 may need to be controlled per requirements. Power control via the open loop gain control 110 involves adjusting the gain of a variable gain amplifier (VGA). Depending upon the gain of the VGA, the output power of the $V_{RF}$ signal 108 can be either scaled up or scaled down. Thereafter, the $V_{RF}$ signal 108 is sent to a power amplifier 112.

The power amplifier 112 amplifies and increases the power efficiency of the $V_{RF}$ signal 108, producing an output signal $V_{OUT}$ 114. Thereafter, to meet the requirements, the $V_{OUT}$ signal 114 can be sent back to the circuit, providing a closed loop power control 116. The closed loop power control 116 involves generating an integrated error signal obtained by subtracting the $V_{OUT}$ signal 114 from a scaled version of the $V_{IN}$ signal 102. A fixed reference value may also be used as the target for the closed loop power control, instead of a scaled version of the $V_{IN}$ signal 102. The integrated error signal is multiplied with a reference value and is sent back into the VGA. After amplification by the power amplifier 112, the $V_{OUT}$ signal 114 can be transmitted via an antenna 118.

Figure 2:
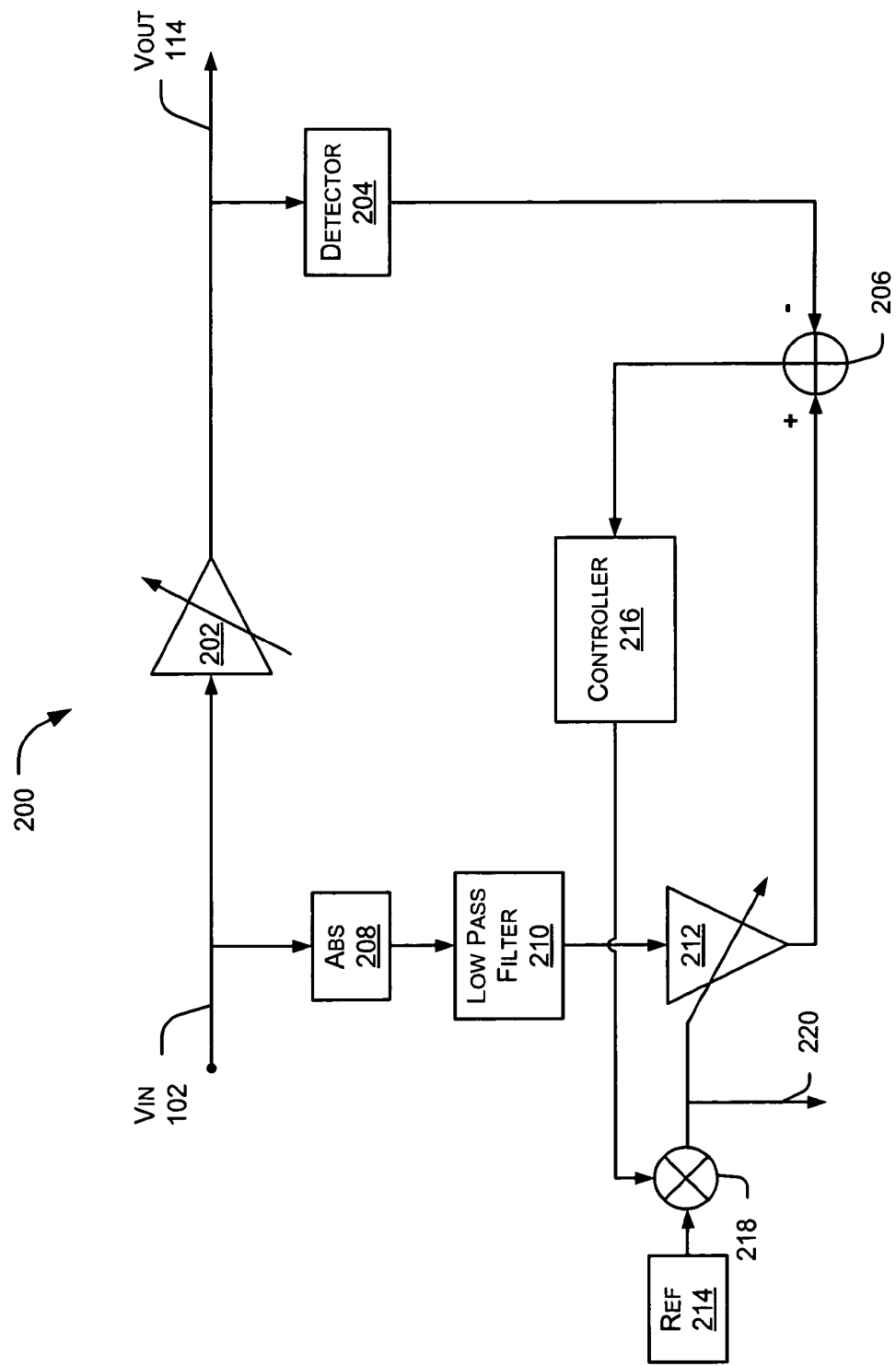
FIG. 2 is a circuit diagram illustrating an exemplary elementary transmission section of a communication device that provides a continuous transition of the power signal from the open loop control to the closed loop control.

FIG. 2 illustrates an exemplary circuit 200 of the transmission section of the communication device of FIG. 1 that provides continuous transition of power signal from the open loop control to the closed loop control. The circuit 200 is meant to explain concepts related to a continuous open loop to closed loop control transition at an elementary level and the number of components shown does not limit the actual implementation of the circuit.

The circuit 200 receives the $V_{IN}$ signal 102 as an input. The $V_{IN}$ signal 102 is modulated into the $V_{RF}$ signal 108. A desired value of the output power of the $V_{RF}$ signal 108 can be set directly by changing the gain of a variable gain amplifier VGA 202. Thus, regulating the output power in the open loop mode involves directly changing the gain of the VGA 202. This regulation of the output power corresponds to the open loop gain control 110, as discussed in FIG. 1. The envelope of the output signal $V_{OUT}$ 114 is measured by a detector 204.

The detected $V_{OUT}$ signal 114 is sent to a subtraction block 206. The subtraction block 206 also receives a filtered and scaled up version of the $V_{IN}$ signal 102. To generate the filtered and scaled up version of the $V_{IN}$ signal 102, the $V_{IN}$ signal 102 is sent to an absolute value generator or abs block 208. The abs block 208 generates an absolute representation of $V_{IN}$ signal 102, and is sent to a low-pass filter 210 to remove any noise or other undesirable high frequency components from the $V_{IN}$ signal 102. The filtered $V_{IN}$ signal 102 is sent to a programmable amplifier 212, which scales up the filtered $V_{IN}$ signal 102 to a nominal reference value as dictated by a reference generator or ref block 214, to generate the filtered and scaled up $V_{IN}$ signal 102. This filtered and scaled up $V_{IN}$ signal 102 is sent to the subtraction block 206.

At the subtraction block 206, the detected $V_{OUT}$ signal 114 is subtracted from the filtered and scaled up $V_{IN}$ signal 102, generating a measurement loop error. The measurement loop error is sent to a controller 216, which includes one or more accumulators or integrators. The controller 216 adjusts the measurement loop error to ensure that there is no inaccurate power step during transition from the open loop mode to the closed loop mode. The output of the controller 216 may be mixed with the nominal reference value, as provided by the ref block 214, at a multiplier 218, resulting in a corrected reference value 220. The controller 216 receives and measures measurement loop error in open loop mode, and generates a correction applied to prevent error when transitioning to closed loop mode.

The corrected reference value 220 determines the level of the nominal reference signal used by the programmable amplifier 212, closing the loop. As a result of the feedback control through the closed loop, the corrected reference value 220 settles to a stationary value after a certain time. After the corrected reference value 220 gets settled, the corrected reference value 220 can be used for controlling the gain of the VGA 202. The controlling of the gain via the corrected reference value corresponds to the closed loop control 116, as described in FIG. 1.

Figure 3A:
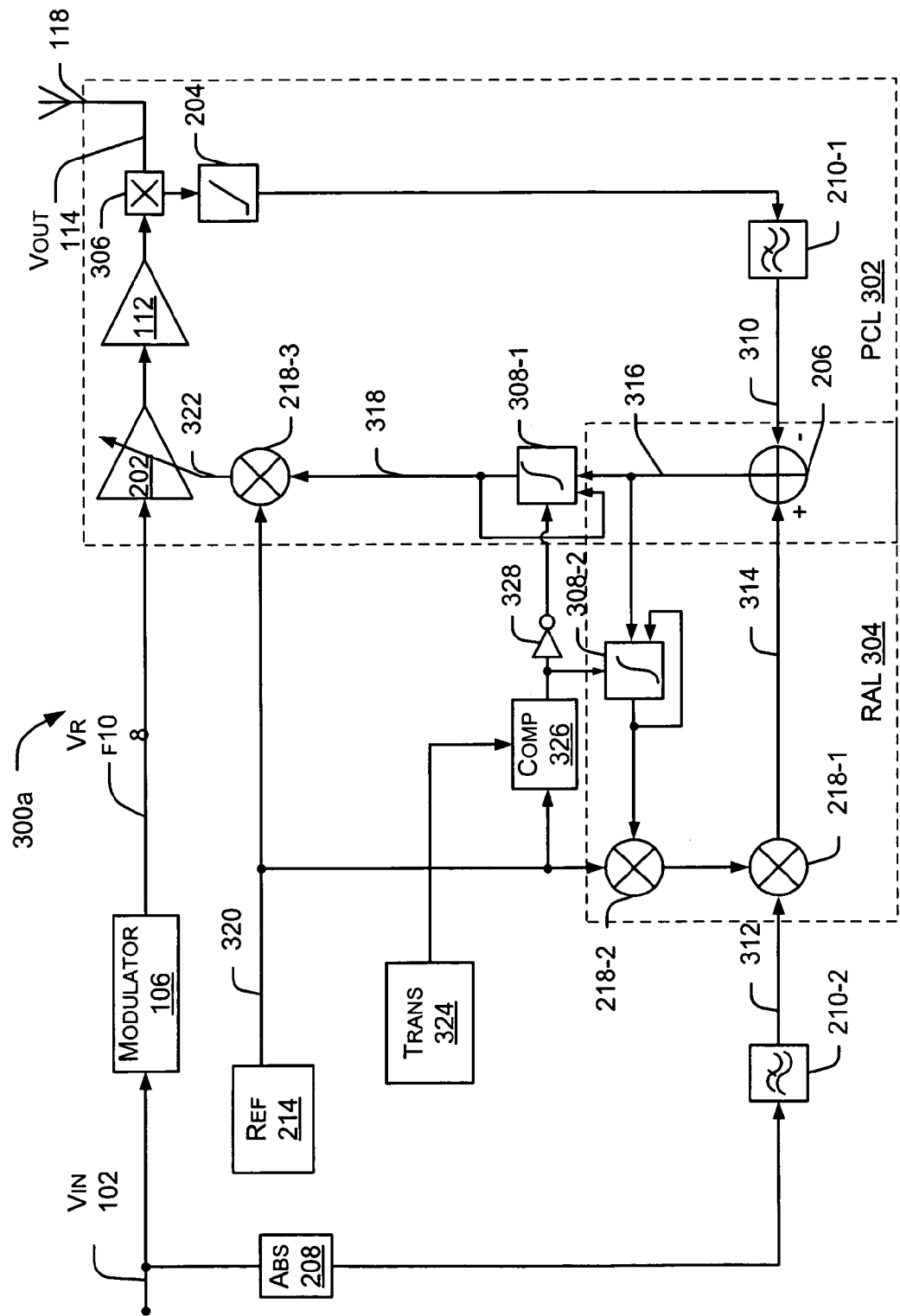
FIG. 3a is another circuit diagram illustrating an exemplary transmission section of a communication device that provides a continuous transition of power signal from the open loop control to the closed loop control.

FIG. 3a illustrates an exemplary detailed circuit 300a of the transmission section of the communication device of FIG. 1 that provides continuous transition of the power signal from the open loop control to the closed loop control. The circuit 300a is meant to illustrate basic concepts related to the subject matter and the number and the type of components shown in the circuit diagram do not limit the scope of the claims.

The circuit 300a receives the $V_{IN}$ signal 102, which is an analog baseband signal. The modulator 106 modulates the $V_{IN}$ signal 102 into the $V_{RF}$ signal 108. Thereafter, the output power of the $V_{RF}$ signal 108 can be adjusted either by the open loop control or by the closed loop control. The circuit 300a includes a power control loop or PCL 302, and a reference adjustment loop or RAL 304.

The PCL 302 includes the VGA 202, the detector 204, a low pass filter 210-1, the subtraction block 206, and an integrator 308-1. The gain of the VGA 202 can be adjusted to regulate the output power of the $V_{RF}$ signal 108 in the open loop mode. The power amplifier 112 optimizes the $V_{RF}$ signal 108, generating the $V_{OUT}$ signal 114. A coupler 306 sends back the $V_{OUT}$ signal 114 into the PCL 302. The coupler 306 may be a directional coupler, which is used to send a signal in the forward direction and provides complete isolation in the reverse direction.

The detector 204 detects the $V_{OUT}$ signal 114. The detector 204 may be a wideband detector, which detects the $V_{OUT}$ signal 114 if the $V_{OUT}$ signal 114 is equal to or above a pre-specified reference value. The detected $V_{OUT}$ signal 114 is then filtered by the low pass filter 210-1 to remove any noise or unwanted high frequency components, to get a filtered signal or $V_{DET}$ 310. The detected signal $V_{DET}$ 310 is sent to the subtraction block 206.

The subtraction block 206 receives another input from the $V_{IN}$ signal 102. The abs block 208 provides an instantaneous magnitude of the $V_{IN}$ signal 102, which is then filtered by the low-pass filter 210-2, thus producing a $V_{MOD}$ signal 312. The $V_{MOD}$ signal 312 is then sent to a multiplier 218-1, where the $V_{MOD}$ signal 312 is multiplied by another signal generated in the RAL 304. The output of the multiplier 218-1, referred to as $V_H$ 314, is applied at the subtraction block 206.

At the subtraction block 206, the $V_{DET}$ 310 is subtracted from the $V_H$ 314 to generate an error signal $V_{ERR}$ 316. The $V_{ERR}$ 316 is integrated by the integrator 308-1 to produce an integrated error signal $V_{INT}$ 318. The $V_{INT}$ 318 is then multiplied by a reference signal $V_{REF}$ 320 to generate a control signal $V_{CNTRL}$ 322. The control signal $V_{CNTRL}$ 322 is used to adjust the gain of the VGA 202.

When the circuit 300a operates in the open loop control mode, the gain of the VGA 202 is adjusted directly without any feedback; however, in the closed loop control mode, a reference value of feedback may also be ascertained and used for controlling the VGA 202. Furthermore, it should be ensured that there is no inaccurate power step or error at the transition boundary of the open loop mode and the closed loop mode.

The switching from the open loop mode to closed loop mode is based on a transition level constant or trans 324. In one implementation, the trans 324 is greater than the pre-specified reference value for the detector 204. A comparator, referred to as comp 326, compares the trans 324 with a value of the pre-specified reference signal 320.

In the open loop mode, the RAL 304 operates. While in the closed loop mode, the PCL 302 operates. The two loops never operate at the same time. An integrator 308-2 in the RAL 304 adjusts the $V_H$ 314 to a value equal to $V_{DET}$ 310. This reference adjustment ensures that the reference to the PCL 302 (i.e., $V_H$ 314) follows the $V_{DET}$ 310, while in the open loop mode. At the time of transition from the open loop mode to the closed loop mode, the detected signal $V_{DET}$ 310 and the reference signal $V_{REF}$ 320 are equal, thereby making the error signal $V_{ERR}$ 316 to zero and also effectively pre-locking the PCL 302 prior to mode transition. On the other hand, in the closed loop mode, the integrator 308-1 in the PCL 302 is ON, integrating the error signal $V_{ERR}$ 316 and multiplying it with the $V_{REF}$ 320, and generating the control signal $V_{CNTRL}$ 322.

The integrators 308-1 and 308-2 may have a reset port, which can be toggled ON or OFF at a pre-defined reference level. In addition, a NOT gate 328 may be used to ensure that when one integrator is running, the other integrator is holding, and vice-versa. The diagram depicts holding by the use of a line feeding the output of the integrator back to the 'init' port of the integrator. By feeding the output value back to the init port, when a reset is applied, the output value is effectively 'held'. Therefore, applying a 'reset' effectively holds the output. However, this function can be implemented by any other technique known in the art. Furthermore, the first initialization value of each integrator is unity and not zero, otherwise there would be no output from the multipliers. If an open loop error exists during operation then the 'init' value will be some offset from unity. The reset value of each integrator is the output value directly prior to reset. The two loops (i.e., PCL 302 and RAL 304) may operate independently and alternately depending on a transition constant (i.e. the state of the comp 326 output).

Figure 3B:
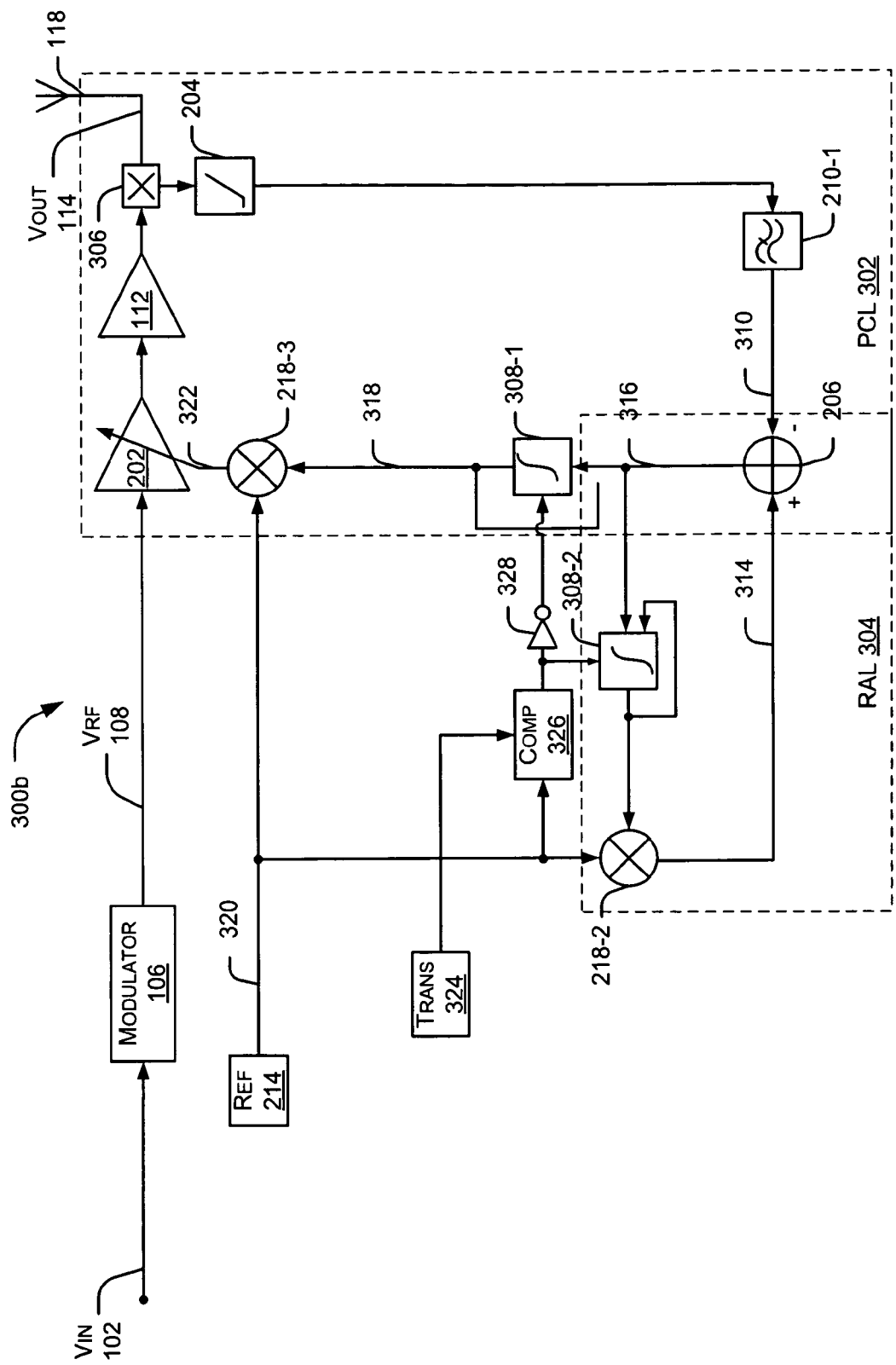

FIG. 3b illustrates a circuit 300b, which is another implementation of the circuit 300a as shown in FIG. 3a. The circuit 300b includes similar components as in the circuit 300a and operates in a manner similar to that described above for the circuit 300a.

The circuit 300b does not require any feedback in the form of the modulated signal $V_{MOD}$ 312. In one implementation, the abs block 208, the filter 210-2, and the multiplier 218-1 can be removed, thus providing the $V_H$ signal 314 obtained from the multiplier 218-2 directly as an input to the subtraction block 206. The operation of the loops RAL 304 and PCL 302 in the circuit 300b remains the same as described for the circuit 300a.

Figure 4:
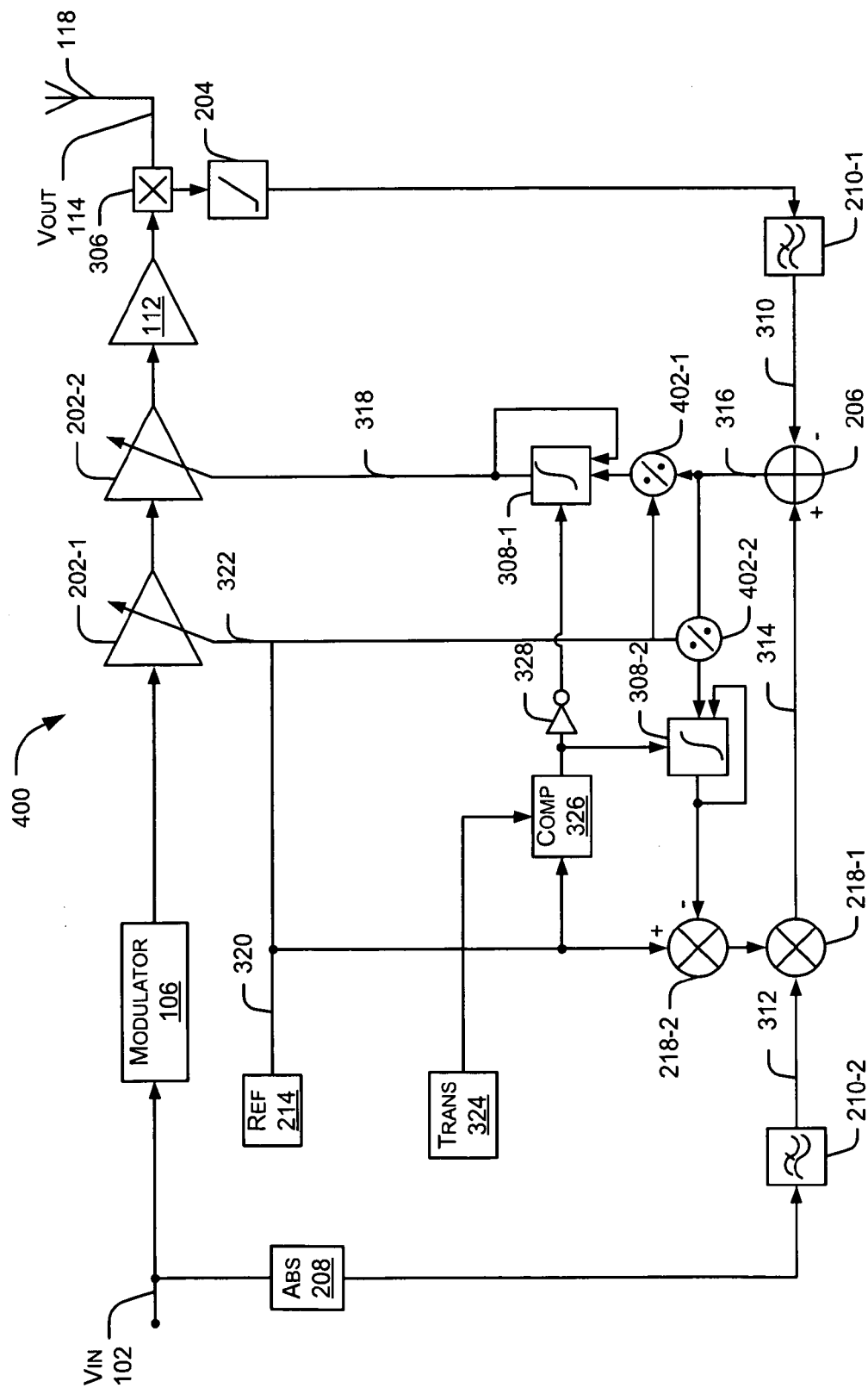
FIG. 4 is a circuit diagram illustrating an exemplary illustrating an exemplary detailed circuit diagram with a dual gain stage and a mechanism for bandwidth compensation.

FIG. 4 illustrates a circuit 400, which is another implementation of the exemplary detailed circuit 300a with a dual gain stage and a mechanism for bandwidth compensation. The circuit 400 works in the same manner as the circuit 300a, and includes certain added features. The components common with FIG. 3a have been referred to by the same names and numerals.

In a mixed-signal system, it may be difficult to obtain large gain adjustments from one VGA stage. To obtain a large gain range, two or more VGA stages can be used in a mixed-signal system. In one implementation, the proposed circuit 400 may include two VGA stages, referred to as VGA-1 202-1 and VGA-2 202-2. In one implementation, the multiplier 218-3 can be removed completely and the VGA-1 202-1 and the VGA-2 202-2 can be controlled directly via the $V_{REF}$ signal 320 and the $V_{INT}$ signal 318, respectively. In such a case, the VGA-1 202-1 controlled by the $V_{REF}$ signal 320 operates in the open loop mode and the transition region whereas the VGA-2 202-2 controlled by the $V_{INT}$ signal 318 should operate in the closed loop mode and the transition region.

The multiplier 218-3 in the circuit 300a, which controls the gain of the VGA 202, varies the bandwidth of the PCL 302 proportionally to the $V_{REF}$ 320. If the variation in the $V_{REF}$ 320 is large, then the bandwidth of the PCL 302 can vary considerably, making the loop design difficult and susceptible to instability. This can be overcome by adding a divider circuit 402-1 prior to the integrator 308-1 in the PCL 302. The divider circuit 402-1 ensures that the gain of the PCL 302 is kept constant and remains independent of the $V_{REF}$ 320. Similarly, a divider circuit 402-2 can be added prior to the integrator 308-2 in the RAL 304 to compensate the variation in loop bandwidth of RAL 304 caused by $V_{REF}$ 320 increasing the gain of the loop via the multiplier 218-2.

Exemplary Methods

The order in which the methods below are described is not intended to be construed as a limitation, and any number of the described method blocks can be combined in any order to implement the methods, or an alternate method. Additionally, individual blocks may be deleted from the methods without departing from the spirit and scope of the subject matter described herein.

The methods introduced may, but need not, be implemented at least partially in architecture(s) such as shown in FIGS. 1 to 4. In addition, it is to be appreciated that certain acts in the methods need not be performed in the order described, may be modified, and/or may be omitted entirely. Furthermore, the methods can be implemented in any suitable hardware, firmware, or a combination thereof, without departing from the scope of the invention.

Figure 5:
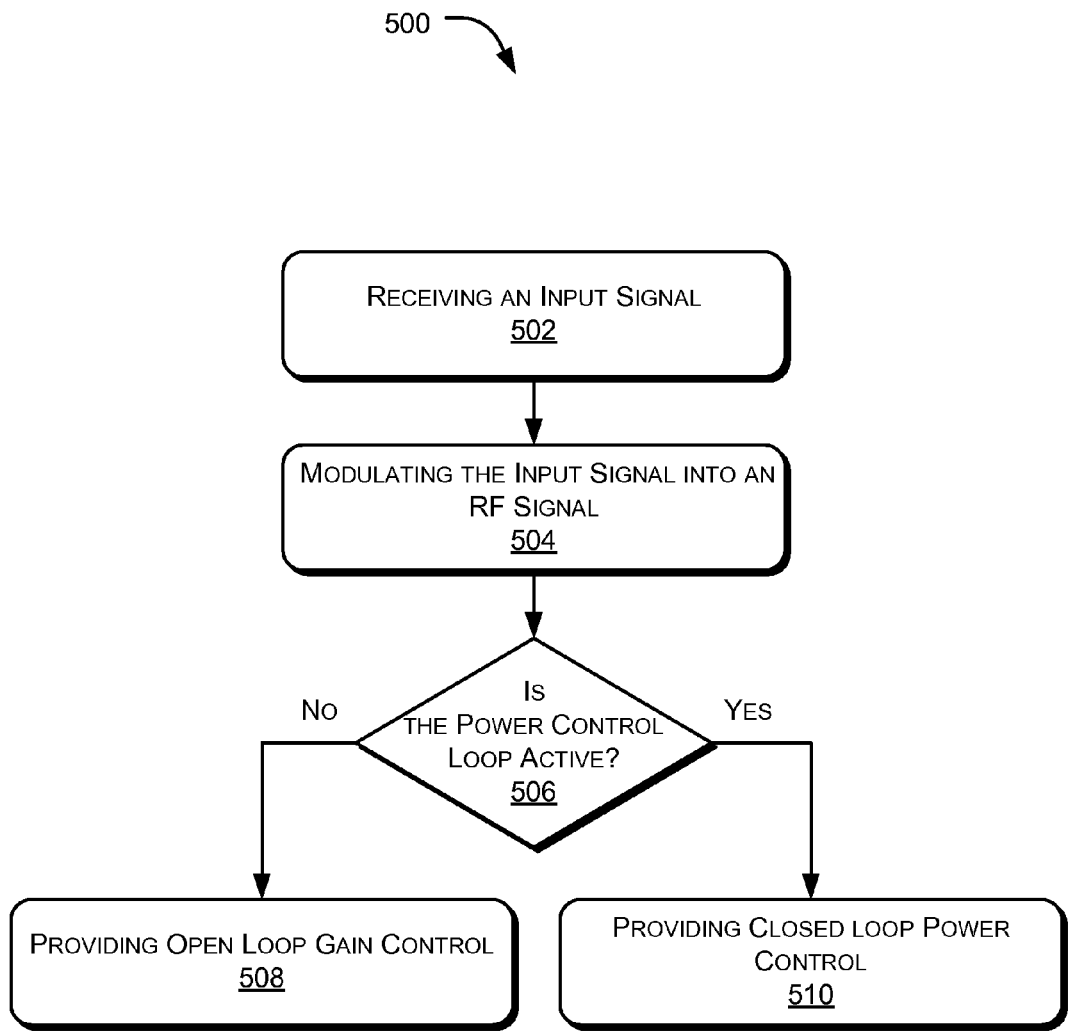
FIG. 5 is a flowchart illustrating an exemplary method for output power control in a transmission section of a communication device.

FIG. 5 is a flowchart 500 illustrating an exemplary method for power control in a communication device.

At block 502, an input signal is received at a transmission section, for example of a communication device, such as a cell phone. In one implementation, the received signal, such as $V_{IN}$ signal 102, can be an analog baseband signal that may correspond to data including voice, text, and/or audio-video data. The $V_{IN}$ signal 102 can be first processed at the preamplifier and buffer 104 and then sent to the modulator 106.

At block 504, the input signal is modulated into an RF signal. In one implementation, the modulator 106, which may be an RF modulator, converts the amplified signal into the $V_{RF}$ signal 108 and conditions the amplified signal to be capable of being transmitted through free space. Thereafter, the output power of the $V_{RF}$ signal 108 is controlled either via an open loop mode or a closed loop mode.

At block 506, a determination is performed as to whether the power control loop is active or not. The value of a transition constant is compared with a reference value. Based on the comparison, it is determined whether to control the output power of the RF signal via the open loop mode or the closed loop mode. In one implementation, the value of the transition constant trans 324 is compared with a pre-specified value of the reference signal 320. Depending on the result of the comparison, either the output power of the $V_{RF}$ signal 108 is controlled either via the open loop mode by running the RAL 304 or via the closed loop mode by running the PCL 302.

If the power control loop is found to be inactive (i.e., following the "NO" branch from block 506), then at block 508, the output power of the RF signal is controlled via the open loop mode. In one implementation, in the open loop mode, the output power is controlled directly by the reference signal $V_{REF}$ 320. In this mode, the integrated error signal $V_{INT}$ 318 has an initialization value of unity and the integrator 308-1 is held in an OFF state due to reset, thereby opening the PCL 302.

If the power control loop is found to be active (i.e., on following the "YES" branch from block 506), then at block 510, the output power of the RF signal is controlled via the closed loop mode. In one implementation, in the closed loop mode, the VGA 202 is controlled via the $V_{CNTRL}$ signal 322. The $V_{CNTRL}$ signal 322 is obtained by multiplication of the $V_{REF}$ signal 320 and the integrated PCL error signal $V_{INT}$ 318. Therefore, in this mode, an offset gain control is provided to the VGA 202.

Figure 6:
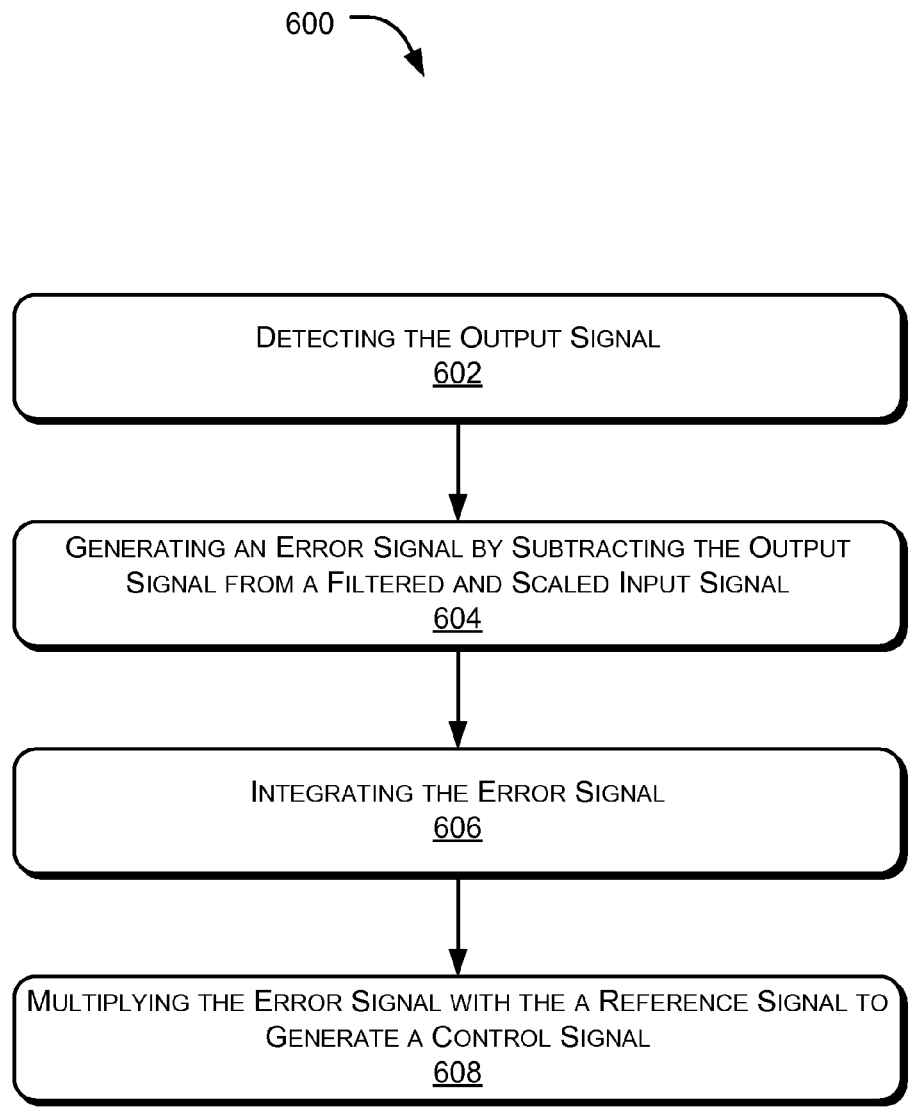
FIG. 6 is a flowchart illustrating an exemplary method for a closed loop output power control in the transmission section of a communication device.

FIG. 6 is a flowchart 600 illustrating an exemplary method for closed loop power control in a communication device.

At block 602, an output signal is detected. In one implementation, the detector 204, which can be a wideband detector, detects the output signal $V_{OUT}$ signal 114. The detector 204 can detect the $V_{OUT}$ signal 114 only if the $V_{OUT}$ signal 114 is equal to or above a value defined by the detector hardware limits (i.e. the detector circuitry has a limited dynamic range). The detected signal at output of the detector 204 is then filtered by the low pass filter 210-1 to remove any noise or unwanted high frequency components. The detected and filtered signal $V_{DET}$ 310 is sent to the subtraction block.

At block 604, an error signal is generated by subtracting the detected signal from a filtered and scaled $V_{IN}$ 102. In one implementation, the detected signal $V_{DET}$ 310 is sent to the subtraction block 206. The subtraction block 206 receives another input signal, which is a processed form of the $V_{IN}$ signal 102. The abs block 208 provides an instantaneous magnitude of the $V_{IN}$ signal 102, which is then filtered by the low-pass filter 210-2, thus producing the $V_{MOD}$ signal 312. The $V_{MOD}$ signal 312 is then sent to the multiplier 218-1, where the $V_{MOD}$ signal 312 is multiplied by another signal generated in the RAL 304. The output of the multiplier 218-1, referred to as $V_H$ signal 314, is fed to the subtraction block 206. At the subtraction block 206, the $V_{DET}$ signal 310 is subtracted from the $V_H$ signal 314 to generate the error signal $V_{ERR}$ 316.

At block 606, the error signal is integrated. In one implementation, the error signal $V_{ERR}$ 316 is integrated by the integrator 308-1 to produce the integrated error signal $V_{INT}$ 318. Since the system is operating in the closed loop mode, the integrator 308-1 in the PCL 302 is in an ON state while the integrator 308-1 in the RAL 304 is in a hold state.

At block 608, the error signal is multiplied with a reference signal to generate a control signal. In one implementation, the integrated signal $V_{INT}$ 318 is multiplied with the reference signal $V_{REF}$ 320 to generate the control signal $V_{CNTRL}$ 322 to adjust the gain of the VGA 202.

Conclusion

Although embodiments for continuous open loop control to closed loop control transition have been described in language specific to structural features and/or methods, it is to be understood that the appended claims are not necessarily limited to the specific features or methods described. Rather, the specific features and methods are disclosed as exemplary implementations for continuous open loop control to closed loop control transition.

What is claimed is:

1. A transmission circuit, comprising:
a variable gain amplifier configured to receive a radio frequency (RF) modulated signal, wherein an output power of the RF signal is adjusted in an open loop mode control by changing a gain of the variable gain amplifier in accordance with a pre-specified reference value;
a subtraction block configured to receive an output of the variable gain amplifier and a scaled-up version of the RF modulated signal generated by modifying the RF modulated signal, and to generate a measurement loop error as the difference between the output of the variable gain amplifier and the scaled-up version of the RF modulated signal;
a controller configured to receive and measure the measurement loop error in the open loop mode control, and to generate a correction applied to prevent error when transitioning to the closed loop mode control;
an absolute value generator configured to receive the RF modulated signal and to generate an absolute representation of the RF modulated signal; and
a programmable amplifier located downstream of the absolute value generator and configured to scale up a received signal to generate the scaled-up version of the RF modulated signal based upon the pre-specified reference value.

2. The transmission circuit of claim 1, wherein the controller includes one or more accumulators or integrators.

3. The transmission circuit of claim 1, wherein the closed loop mode control includes generating an integrated error signal.

4. The transmission circuit of claim 1, further comprising:
a multiplier configured to mix the pre-specified reference value with the correction to generate a corrected reference value that is applied to the variable gain amplifier in a closed loop control mode.

5. The transmission circuit of claim 1, wherein the RF modulated signal is modified as a function of the pre-specified reference value to generate the scaled-up version of the RF modulated signal that is provided to the subtraction block.

6. The transmission circuit of claim 1, wherein the subtraction block is configured to generate the measurement loop error by adjusting a value of the scaled-up version of the RF modulated signal to be equal to a value of the output of the variable gain amplifier when transitioning from the open loop mode control to a closed loop mode control, thereby setting the measurement loop error equal to zero at a time of the transition.

7. The transmission circuit of claim 1, further comprising:
a low pass filter coupled between the absolute value generator and the programmable amplifier and configured to receive the RF modulated signal.

8. A method for power control comprising:
receiving an input signal at a transmission section;
checking whether a power control loop is active;
comparing a transition constant of the power control loop with a scaled baseband (BB) input signal to determine whether to control power of a received radio frequency (RF) signal by open loop mode or by closed loop mode; and
if the power control loop is active, controlling the output power of the received RF signal by the closed loop mode in which output power is controlled by multiplication of a reference signal with an error signal generated as a difference between a measured output signal of the transmission section and a modification of the input signal of the transmission section;
if the power control loop mode is not active, controlling the output power of the received RF signal by the open loop mode in which output power is controlled by the reference signal.

9. The method of claim 8, wherein the received RF signal is a modulated and amplified signal.

10. The method of claim 8, wherein the open loop mode is controlled by a reference signal.

11. The method of claim 8, wherein generating the error signal further comprises adjusting a first value of the scaled input signal to be equal to a second value of the detected output signal when transitioning from open loop mode to closed loop mode, thereby setting the error signal equal to zero at a time of the transition.

12. A method for closed loop power control comprising:
detecting an output signal of a variable gain amplifier;
generating an error signal by subtracting the detected output signal from a scaled version of an input signal that is input to the variable gain amplifier, wherein the scaled input signal is generated by amplifying an input signal to the transmission circuit with a programmable amplifier;
integrating the error signal;
multiplying the integrated error signal with a reference signal to generate a control signal,
wherein generating the scaled input signal further comprises:
receiving the input signal to the transmission circuit;
passing the input signal through an absolute value generator to generate an absolute representation of the input signal;
filtering the absolute representation of the input signal through a band pass filter; and
amplifying the filtered absolute representation of the input signal with a programmable amplifier.

13. The method of claim 12, wherein generating the error signal comprises using an input from an open loop control mode.

14. The method of claim 13, wherein generating the error signal further comprises adjusting a first value of the scaled input signal to be equal to a second value of the detected output signal when transitioning from open loop mode to closed loop mode, thereby setting the error signal equal to zero at a time of the transition.

15. A transmission circuit in a communication device that provides a transition of power signal control from open loop mode to closed loop mode comprising:
a modulator that receives a baseband (BB) signal, and modulates the baseband signal to a radio frequency (RF) signal, wherein output power of the RF signal may be adjusted by open loop control or closed loop control;
a comparator that compares a transition constant of the power control loop with a reference value to determine a transition between the open loop mode and the closed loop mode;
a power control loop (PCL) that operates in the closed loop mode, the PCL comprising:
a variable gain amplifier (VGA) having a gain that is adjusted to regulate the output power of the RF signal;
a low-pass filter that removes noise from output of the VGA; and
a divider circuit to accommodate a wide output power bandwidth; and
a reference adjustment loop (RAL) that operates in the open loop mode,
wherein the transmission circuit is part of a mixed-signal system, and the PCL comprises multiple variable gain amplifiers having gains that are adjusted to regulate the output power of the RF signal.

16. The method of claim 12, wherein the scaled input signal further comprises an analog or digital baseband signal.

* * * * *